US012541839B2

(12) United States Patent
Wang et al.

(10) Patent No.: US 12,541,839 B2
(45) Date of Patent: Feb. 3, 2026

(54) METHOD AND DEVICE FOR DETERMINING COORDINATES OF CONTACT THROUGH-HOLES IN MEMORY DEVICE

(71) Applicant: Yangtze Memory Technologies Co., Ltd., Wuhan (CN)

(72) Inventors: Wenqi Wang, Wuhan (CN); Guangdian Chen, Wuhan (CN); Jinxing Chen, Wuhan (CN); Yanli Wang, Wuhan (CN); Zongliang Huo, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 505 days.

(21) Appl. No.: 18/090,174

(22) Filed: Dec. 28, 2022

(65) Prior Publication Data

US 2024/0177292 A1 May 30, 2024

(30) Foreign Application Priority Data

Nov. 29, 2022 (CN) ............ 202211511553.4

(51) Int. Cl.
*G06T 5/30* (2006.01)
*G06T 5/50* (2006.01)
(Continued)

(52) U.S. Cl.
CPC ............ *G06T 7/0008* (2013.01); *G06T 5/30* (2013.01); *G06T 5/50* (2013.01); *G06V 10/28* (2022.01);
(Continued)

(58) Field of Classification Search
CPC .......... G06T 7/0008; G06T 5/30; G06T 5/50; G06T 2207/20221; G06T 2207/20224;
(Continued)

(56) References Cited

U.S. PATENT DOCUMENTS 6,232,787 B1 * 5/2001 Lo .............. H01J 37/268
250/311
6,539,106 B1 * 3/2003 Gallarda ............. G06V 10/987
382/286

(Continued)

OTHER PUBLICATIONS

"Shape Analysis & Measurement", Michael A. Wirth, University of Guelph Computing and Information Science Image Processing Group (Year: 2004).*

(Continued)

*Primary Examiner* — Stephen R Koziol
*Assistant Examiner* — Joshua Chen
(74) *Attorney, Agent, or Firm* — Anova Law Group, PLLC

(57) ABSTRACT

A method of determining coordinates of contact through-holes (CTs) in a memory device includes: obtaining a bright voltage contrast (BVC) image including a plurality of CTs in the memory device; converting color components in the BVC image into grayscale values to obtain a grayscale BVC image; performing a dilation process on the grayscale BVC image to obtain a dilated grayscale BVC image; calculating a first threshold for the dilated grayscale BVC image and determining whether the first threshold is greater than or equal to a pre-determined value; in response to the first threshold being greater than or equal to the pre-determined value, performing a first image process on the dilated grayscale BVC image to obtain coordinates of each CT; and in response to the first threshold being smaller than the pre-determined value, performing a second image process on the dilated grayscale BVC image to obtain the coordinates of each CT.

19 Claims, 6 Drawing Sheets

(51) Int. Cl.
*G06T 7/00* (2017.01)
*G06V 10/28* (2022.01)
*G06V 10/46* (2022.01)
*H04N 1/40* (2006.01)

(52) U.S. Cl.
CPC ......... *G06V 10/46* (2022.01); *H04N 1/40012* (2013.01); *G06T 2207/20221* (2013.01); *G06T 2207/20224* (2013.01); *G06V 2201/07* (2022.01)

(58) Field of Classification Search
CPC ......... G06T 7/0004; G06T 2207/30148; G06T 7/11; G06T 2207/10061; G06T 7/136; G06T 7/001; G06T 7/70; G06T 2207/10081; G06V 10/28; G06V 10/46; G06V 2201/07; H04N 1/40012
See application file for complete search history.

(56) References Cited

U.S. PATENT DOCUMENTS

| | | | |
|---|---|---|---|
| 7,257,267 B2* | 8/2007 | Recht | G06V 10/28 |
| | | | 382/248 |
| 2010/0320381 A1* | 12/2010 | Zhao | H01J 37/28 |
| | | | 250/306 |
| 2018/0330494 A1* | 11/2018 | Tanaka | G06T 7/0004 |

OTHER PUBLICATIONS

Oberai, Ankush, and Jiann-Shiun Yuan. "Smart E-beam for defect identification & analysis in the nanoscale technology nodes: technical perspectives." Electronics 6.4 (2017): 87. (Year: 2017).*

* cited by examiner

METHOD AND DEVICE FOR DETERMINING COORDINATES OF CONTACT THROUGH-HOLES IN MEMORY DEVICE

CROSS-REFERENCE TO RELATED APPLICATION

This application claims the priority to Chinese Patent Application No. 202211511553.4, filed on Nov. 29, 2022, the content of which is incorporated herein by reference in its entirety.

TECHNICAL FIELD

The present disclosure relates to the technical field of semiconductor device manufacturing and, more particularly, to a method and a device for determining coordinates of contact through-holes (CTs) in a memory device.

BACKGROUND

When manufacturing a three-dimensional (3D) memory array, a staircase area is formed at an end of each stacked structure including alternately stacked insulating layers and conductive gate layers. Contact through-holes (CTs) connecting to the gate layers in the staircase areas are formed by etching in staircase areas. The CTs are then filled to form conductive plugs, which are used to bring out electrical signals from the gate layers.

SUMMARY

One aspect of the present disclosure provides a method of determining coordinates of contact through-holes (CTs) in a memory device. The method includes: obtaining a bright voltage contrast (BVC) image including a plurality of CTs in the memory device; converting color components in the BVC image into grayscale values to obtain a grayscale BVC image; performing a dilation process on the grayscale BVC image to obtain a dilated grayscale BVC image; calculating a first threshold for the dilated grayscale BVC image and determining whether the first threshold is greater than or equal to a pre-determined value, where the first threshold is an Otsu threshold; in response to the first threshold being greater than or equal to the pre-determined value, performing a first image process on the dilated grayscale BVC image to obtain coordinates of each CT in the dilated grayscale BVC image; and in response to the first threshold being smaller than the pre-determined value, performing a second image process on the dilated grayscale BVC image to obtain the coordinates of each CT in the dilated grayscale BVC image.

Another aspect of the present disclosure provides a method of determining coordinates of contact through-holes (CTs) in a memory device. The method includes: obtaining a bright voltage contrast (BVC) image including a plurality of CTs in the memory device; converting color components in the BVC image into grayscale values to obtain a grayscale BVC image; performing a dilation process on the grayscale BVC image to obtain a dilated grayscale BVC image; performing an erosion process on the grayscale BVC image to obtain an eroded grayscale BVC image; subtracting the eroded grayscale BVC image from the dilated grayscale BVC image to obtain a morphed grayscale BVC image; calculating a first threshold for the morphed grayscale BVC image and using the first threshold to perform a binarization process on the morphed grayscale BVC image to obtain a binarized BVC image containing a plurality of contours, wherein the first threshold is an Otsu threshold; and determining coordinates of a center of each of the plurality of contours to be coordinates of each CT in the binarized BVC image.

Another aspect of the present disclosure provides a device of determining coordinates of contact through-holes (CTs) in a memory device. The device includes a display screen, a memory storing program instructions, and a processor configured to execute the program instructions stored in the memory to: obtain a bright voltage contrast (BVC) image including a plurality of CTs in the memory device; convert color components in the BVC image into grayscale values to obtain a grayscale BVC image; perform a dilation process on the grayscale BVC image to obtain a dilated grayscale BVC image; calculate a first threshold for the dilated grayscale BVC image and determine whether the first threshold is greater than or equal to a pre-determined value, wherein the first threshold is an Otsu threshold; in response to the first threshold being greater than or equal to the pre-determined value, perform a first image process on the dilated grayscale BVC image to obtain coordinates of each CT in the dilated grayscale BVC image; and in response to the first threshold being smaller than the pre-determined value, perform a second image process on the dilated grayscale BVC image to obtain the coordinates of each CT in the dilated grayscale BVC image.

BRIEF DESCRIPTION OF THE DRAWINGS

To more clearly illustrate the technical solution in embodiments of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Figure 1:
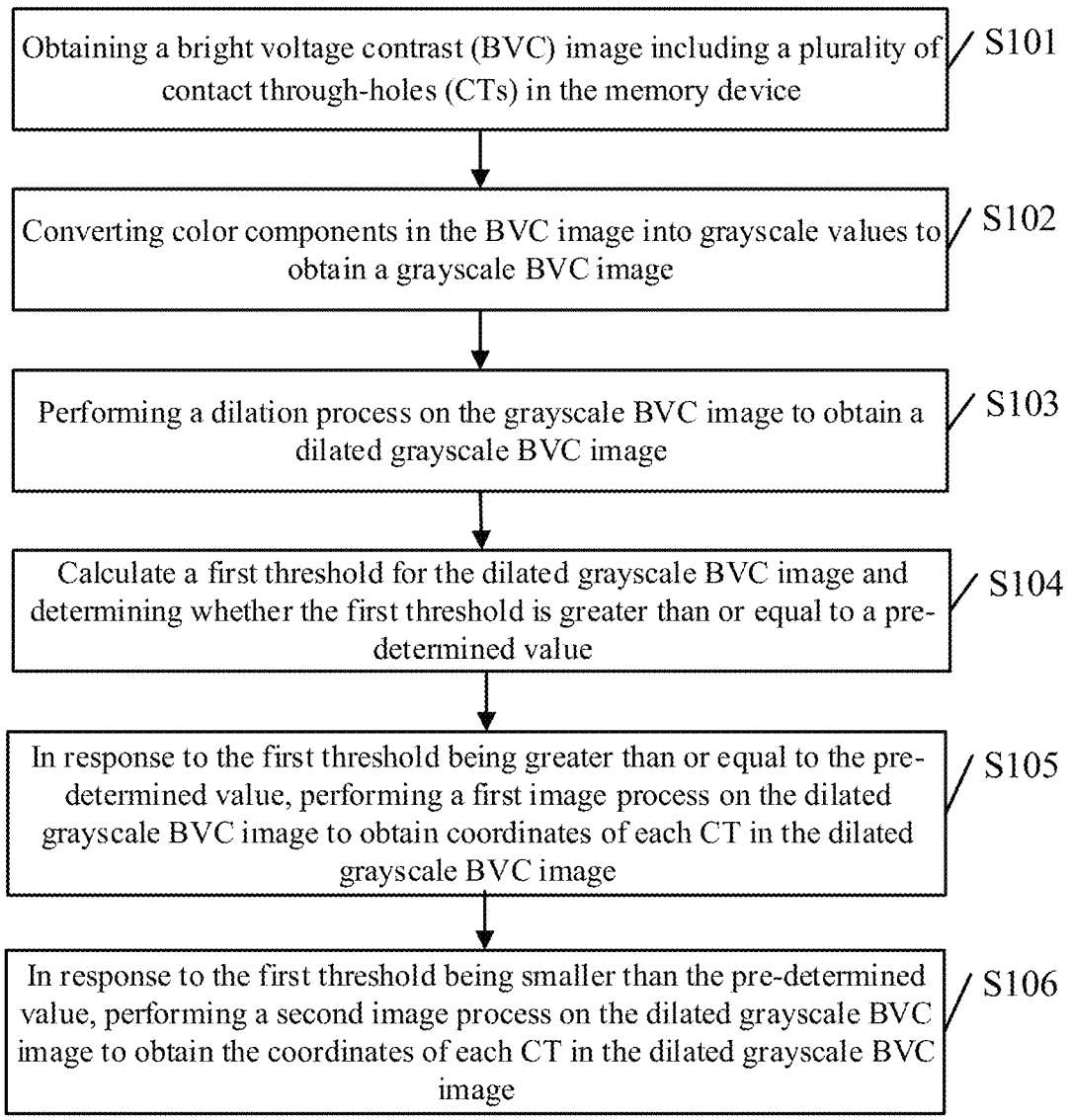
FIG. 1 is a schematic flowchart of an exemplary method for determining coordinates of CTs in a BVC image according to embodiments of the present disclosure.

Technical solutions in the embodiments of the present disclosure will be clearly described below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

Embodiments of the present disclosure will be described in detail in connection with the drawings. Under circumstances of no conflict, the following embodiments and features in the embodiments may be combined with each other.

The present disclosure may be applied to testing three-dimensional (3D) NAND memory arrays. When manufacturing the 3D NAND memory arrays, a staircase area is formed at an end of each stacked structure including alternately stacked insulating layers and conductive gate layers. Contact through-holes (CTs) connecting to the gate layers in the staircase areas are formed by etching in the staircase areas. The CTs are then filled to form conductive plugs, which are used to bring out electrical signals from the gate layers.

As memory technologies advance and memory capacity needs grow, distribution structure of 3D memory arrays is often adjusted accordingly. When multiple positions of a same memory array (at least hundreds of thousands of positions), such as multiple previously described CT positions are inspected by an electronic beam (E-Beam) inspection machine to detect leakage on the CTs, it is difficult to rapidly match at least hundreds of thousands of detected bright voltage contrast (BVC) positions with corresponding CT positions due to fast change of CT distribution. Thus, it is difficult to accurately identify the CT positions corresponding to BVC positions indicating defects, thereby making it difficult to locate defective CT positions.

As the demand for data storage density continues to increase, the number of layers of the stacked structure increases accordingly. When forming the CTs, to ensure that the gate layers in lower staircase areas relatively close to a substrate can be successfully connected, the gate layers in upper staircase areas relatively far away from the substrate may be easily over etched to cause etching through or punch through, thereby resulting in shorts between two adjacent gate layers through the conductive plugs and reducing production yield. Those skilled in the art should understand that the 3D memory arrays tested by the embodiments of the present disclosure are not limited to the devices that have completed all the manufacturing processes, and may include the 3D memory array structures on the production line after the CTs have been formed.

In practical inspection processes, voltage contrast (VC) methods are often used to detect whether the CTs have leakage currents. The CT positions indicated in VC image may be inspected for defects. The operation principle is to bombard bottoms of the CTs with a focused electron beam (E-beam) to excite secondary electrons. The number of secondary electrons generated at defective CTs and normal CTs are different, and corresponding transmission efficiencies are different as well. A secondary electron distribution may be captured in a voltage contrast image as brightness variation in the voltage contrast image. Thus, the defective CTs may be determined by examining brightness variation in the voltage contrast image.

The E-beam inspection includes bright voltage contrast (BVC) and dark voltage contrast (DVC). The BVC is often used to detect leakage current induced defects. The DVC is often used to detect openings caused by defects in the conductive plugs. In practical detection processes, a scope of the detection may include a memory chip (a smallest unit that can independently execute commends or report status) or a memory block (a smallest unit that can be erased by a single erase operation). The number of CTs to be inspected may be at least several hundred thousand. When some CTs included in the voltage contrast images are diagnosed to have leakage currents, it is important to locate the defective CTs in the memory chip or the memory block for subsequent processing.

A memory device, such as a NAND memory device, may include a substrate, a plurality of NAND strings on the substrate, one or more peripheral devices above the plurality of NAND strings, and a plurality of contact through-holes (CTs) connecting word lines of the plurality of NAND strings with the one or more peripheral devices. A word line selects which row of bits in the memory device to be read or written. In a process of manufacturing such 3D memory array devices, an E-beam machine is often used to scan a wafer to detect defective CTs that cause current leakage between different word lines. In a scanning process, the CTs are charged by an electron beam word line by word line to look for current leakage between adjacent word lines. In a BVC image, the charged CTs look brighter than the CTs that are not charged. However, when a charged CT is shorted to an adjacent CT that is not charged, the adjacent CT that is not charged also looks bright. Currently, the CTs that are charged by the electron beam and the CTs that are charged by leakage currents cannot be differentiated by existing tools. By manually examining CTs in the voltage contrast images scanned by the E-beam machine, a technical person may determine whether the CTs that look brighter are normal or defective. The defective CTs are charged by the leakage currents and are causing word line shorts. However, manually examining the voltage contrast images takes about a half day for one person to finish examining one wafer. Further, the manual examination or inspection is not sufficiently accurate, is unable to group the defective CTs by tier, and is unable to visually illustrate distribution of the defective CTs on a wafer level map.

The present disclosure also provides a method for determining coordinates of CTs in a memory device. As shown in FIG. 1, the method for determining the coordinates of each CT in the memory device includes the following processes.

At S101, a BVC image including a plurality of CTs in the memory device is obtained.

In some embodiments, the BVC image including the plurality of CTs in the memory device is obtained. The plurality of CTs may include the charged CTs and the uncharged CTs.

At S102, color components in the BVC image are converted into grayscale values to obtain a grayscale BVC image.

In some embodiments, the BVC image may be a color image. The color components in the BVC image may be converted into grayscale values. For example, a grayscale value is calculated by the following equation:

$$\text{Gray} = 0.299 \cdot \text{Red} + 0.587 \cdot \text{Green} + 0.114 \cdot \text{Blue},$$

where Gray, Red, Green, and Blue are an integer between 0 and 255 inclusively.

The grayscale value for black is 0 and the grayscale value for white is 255. A greater grayscale value indicates a brighter pixel and a smaller grayscale value indicates a darker pixel.

At S103, a dilation process is performed on the grayscale BVC image to obtain a dilated grayscale BVC image.

In some embodiments, after the grayscale BVC image is obtained, a Gaussian smooth (also known as Gaussian blur) process may be performed on the grayscale BVC image to reduce noises and details before performing the dilation process. Then, the dilation process is performed on the grayscale BVC image after the Gaussian smooth process is performed.

Figure 2:
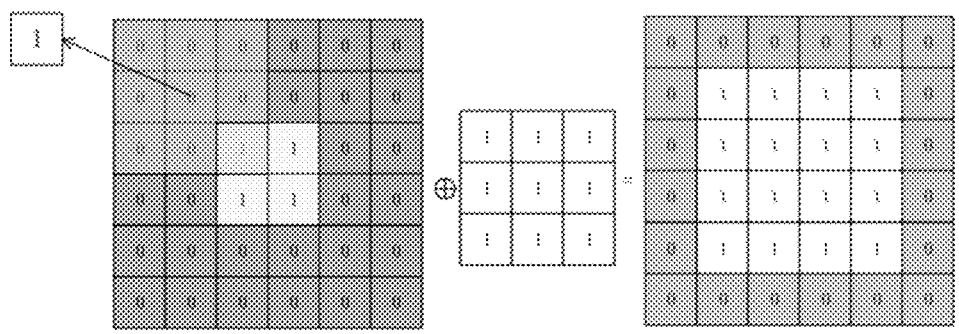
FIG. 2 is a schematic diagram showing a dilation process according to embodiments of the present disclosure.

In some embodiments, as shown in FIG. 2, in the dilation process, an image A on the left is overlaid by an image B to obtain an image on the right according to $A \oplus B = \{x | (B)_x \cap A \neq \Phi\}$. In contrast to an erosion process, the dilation process makes bright pixels in the grayscale BVC image brighter.

At S104, a first threshold is calculated for the dilated grayscale BVC image and whether the first threshold is greater than or equal to a pre-determined value is determined.

In some embodiments, Otsu's method is used to calculate the first threshold for the dilated BVC image. Otsu's method returns the first threshold to separate pixels in the dilated BVC image into a foreground and a background. The first threshold is determined by minimizing intra-class grayscale variance or maximizing inter-class grayscale variance. The first threshold T1 can be calculated by $$T1 = \mathrm{argmax}\{\delta_b(t)\} = \underset{1 \leq t \leq L}{\mathrm{argmax}}\{P_0(t)u_0^2(t) + P_1(t)u_1^2(t)\}.$$

At S105, in response to the first threshold being greater than or equal to the pre-determined value, a first image process is performed on the dilated grayscale BVC image to obtain coordinates of each CT in the dilated grayscale BVC image.

In some embodiments, the first threshold is a mid-point grayscale value that one half of pixels in the dilated grayscale BVC image have grayscale values greater than or equal to the mid-point grayscale value and another half of pixels in the dilated grayscale BVC image have grayscale values smaller than the mid-point grayscale value. When the first threshold is greater than or equal to the pre-determined value, the dilated grayscale BVC image is relatively bright. In this case, the first image process is performed on the dilated grayscale BVC image to obtain coordinates of each CT in the dilated grayscale BVC image.

At S106, in response to the first threshold being smaller than the pre-determined value, a second image process is performed on the dilated grayscale BVC image to obtain the coordinates of each CT in the dilated grayscale BVC image.

In some embodiments, when the first threshold is smaller than the pre-determined value, the dilated grayscale BVC image is relatively dark. In this case, the second image process is performed on the dilated grayscale BVC image to obtain coordinates of each CT in the dilated grayscale BVC image.

In some embodiments, the pre-determined value is 150. When the first threshold is greater than or equal to 150, it indicates that the grayscale BVC image is relatively bright. The first image process is more suitable for the relatively bright grayscale BVC image. When the first threshold is smaller than 150, it indicates that the grayscale BVC image is relatively dark. The second image process is more suitable for the relatively dark grayscale BVC image. By processing the relatively bright grayscale BVC image and the relatively dark grayscale BVC image differently, the coordinates of each CT are determined more accurately.

In some embodiments, to process the relatively bright grayscale BVC image, the first image process includes: using the first threshold to perform a binarization process on the dilated grayscale BVC image to obtain a first binarized BVC image; determining a plurality of first contours in the first binarized BVC image; and determining coordinates of a center of each of the plurality of first contours to be the coordinates of each CT.

Figure 3:
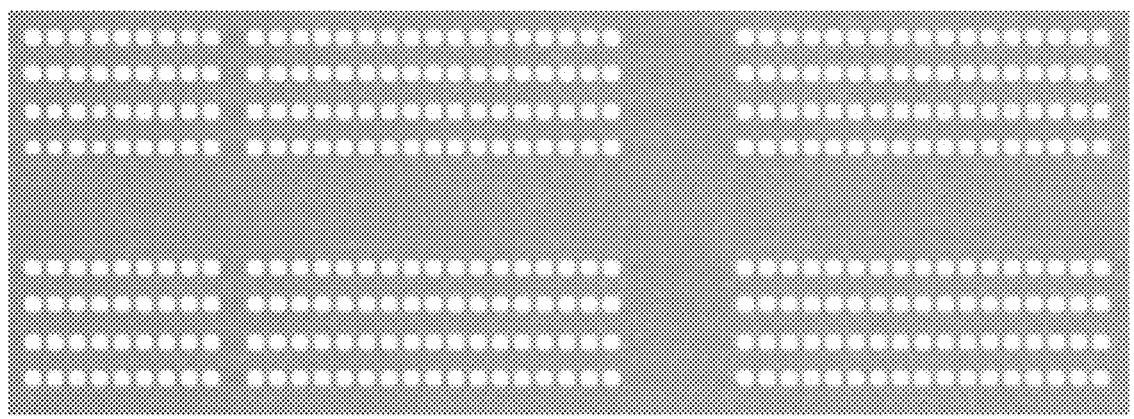
FIG. 3 is a schematic diagram of an exemplary grayscale BVC image according to embodiments of the present disclosure.
Figure 4:
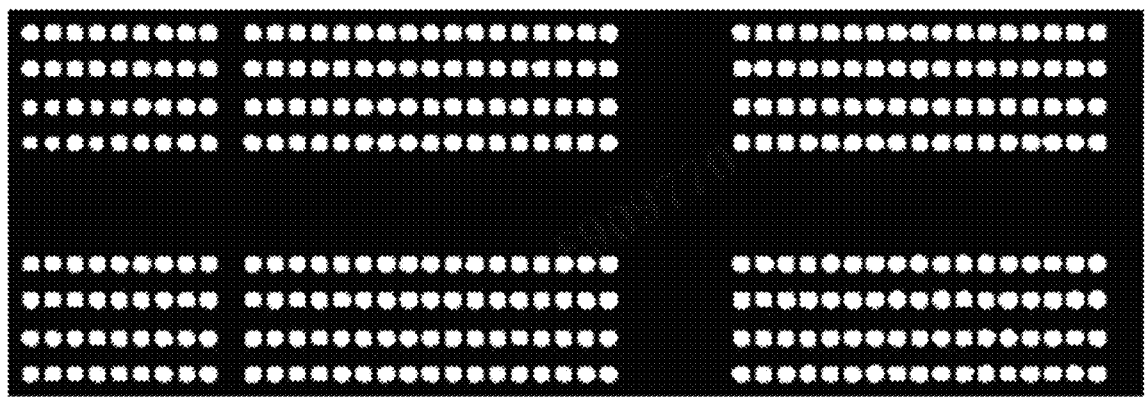
FIG. 4 is a schematic diagram of an exemplary grayscale BVC image after a binarization process is performed on FIG. 3.

For example, FIG. 3 is a schematic diagram of an exemplary grayscale BVC image according to embodiments of the present disclosure. FIG. 4 is a schematic diagram of an exemplary grayscale BVC image after a binarization process is performed on FIG. 3.

Figure 5:
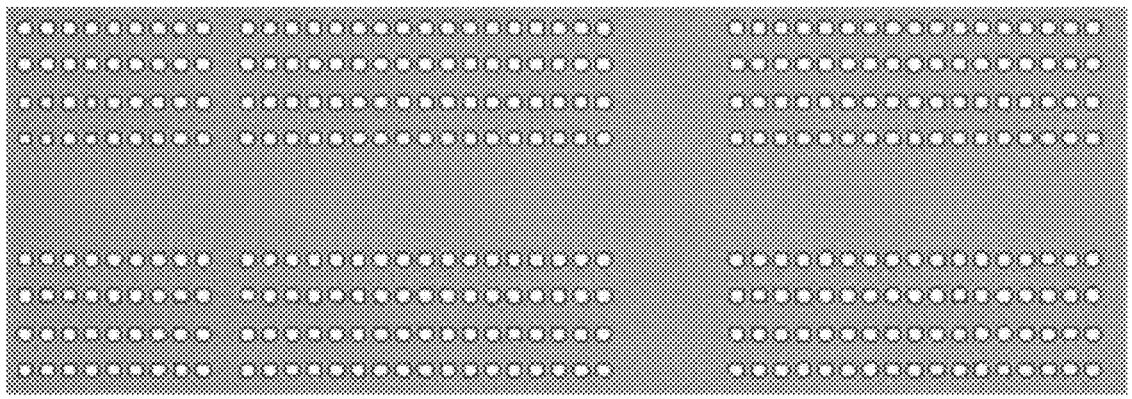
FIG. 5 is a schematic diagram of an exemplary grayscale BVC image after a plurality of first contours are determined based on FIG. 4.

For example, FIG. 5 is a schematic diagram of an exemplary grayscale BVC image after a plurality of first contours are determined based on FIG. 4. The plurality of first contours are circle-like shapes in FIG. 5

In some embodiments, after determining the plurality of first contours in the first binarized BVC image, the first image process further includes: calculating a width-over-height ratio and a perimeter of each of the plurality of first contours in the first binarized BVC image; determining whether the width-over-height ratio satisfies a width-over-height ratio condition and whether the perimeter satisfies a perimeter condition; and removing the corresponding contour from the plurality of first contours in response to the width-over-height ratio unsatisfying the width-over-height ratio condition or the perimeter unsatisfying the perimeter condition.

A CT contour is approximately circle-shaped. As such, the width-over-height ratio of the CT contour is approximately 1. For example, the width-over-height ratio condition is a range between 0.9 and 1.1. The width-over-height ratio satisfies the width-over-height ratio condition when the calculated width-over-height ratio is between 0.9 and 1.1. The width-over-height ratio condition is unsatisfied when the calculated width-over-height ratio is small than 0.9 or and greater than 1.1. Further, a size of a CT for a particular memory device design is known in advance. When the calculated perimeter of the CT is approximately same as the known size of the CT, the perimeter satisfies the perimeter condition. When the calculated perimeter of the CT is smaller than or greater than the known size of the CT by a certain percentage, the perimeter condition is unsatisfied. For example, the certain percentage is 15%. By checking the width-over-height ratio and the perimeter, contours unlikely to be the CTs are eliminated.

In some embodiments, when determining the coordinates of the center of each of the plurality of first contours to the coordinates of each CT, the first image process further includes: obtaining coordinates of a center of gravity of each of the plurality of first contours based on a zero-order and a first-order moments of the corresponding first contour; and determining the coordinates of the center of gravity of the corresponding first contour to be the coordinates of each CT.

In some embodiments, a center of a circle-like shape can be determined by the following equations:

$$X_C = \frac{M_{10}}{M_{00}}, \text{ and}$$

$$Y_C = \frac{M_{01}}{M_{00}}.$$

The coordinates of the center of the circle-like shape are the coordinates of the center of the corresponding CT.

In some embodiments, to process the relatively dark grayscale BVC image, the second image process includes: using a second threshold to perform a binarization process on the dilated grayscale BVC image to obtain a second binarized BVC image; determining a plurality of second contours in the second binarized BVC image; performing an erosion process on the dilated grayscale BVC image to obtain an eroded grayscale BVC image; subtracting the eroded grayscale BVC image from the dilated grayscale BVC image to obtain a morphed grayscale BVC image; using the first threshold to perform a binarization process on the morphed grayscale BVC image to obtain a third binarized BVC image; determining a plurality of third contours in the third binarized BVC image; combining the plurality of second contours and the plurality of third contours to obtain a plurality of fourth contours; and determining coordinates of a center of each of the plurality of fourth contours to be the coordinates of each CT. In the second image process, relatively bright CTs and relatively dark CTs are processed differently to more accurately determine the contours of both the relatively bright CTs and the relatively dark CTs.

In some embodiments, the second threshold is 200.

In some embodiments, after obtaining the plurality of fourth contours, the second image process further includes: calculating a width-over-height ratio and a perimeter of each of the plurality of fourth contours; determining whether the width-over-height ratio satisfies a width-over-height ratio condition and whether the perimeter satisfies a perimeter condition; and removing the corresponding contour from the plurality of fourth contours in response to the width-over-height ratio unsatisfying the width-over-height ratio condition or the perimeter unsatisfying the perimeter condition.

In some embodiments, when determining the coordinates of the center of each of the plurality of fourth contours to be the coordinates of each CT, the second image process further includes: obtaining coordinates of a center of gravity of each of the plurality of fourth contours based on a zero-order and a first-order moments of the corresponding fourth contour; and determining the coordinates of the center of gravity of the corresponding fourth contour to be the coordinates of each CT.

In some embodiments, after the coordinates of each CT in the dilated grayscale BVC image are determined, a CT coordinate validation process is performed to add missing coordinates and remove incorrect coordinates. The CT coordinate validation process includes comparing a distribution pattern based on the coordinates of each CT in the dilated grayscale BVC image with a pre-determined CT distribution pattern, and adding coordinates of CTs absent in the distribution pattern based on the coordinates of each CT in the dilated grayscale BVC image and removing coordinates of CTs absent in the pre-determined CT distribution pattern. The pre-determined CT distribution pattern varies for different memory devices. When the coordinates of most CTs are correctly determined, the missing coordinates and the incorrect coordinates can be easily identified and compensated.

In some embodiments, after the coordinates of each CT in the dilated grayscale BVC image are determined, a grayscale value at a position of coordinates of each CT in the grayscale BVC image is reviewed to determine whether the corresponding CT is a defective CT. In response to a defective CT being determined in the grayscale BVC image, the defective CT is displayed on a display screen.

In the embodiments of the present disclosure, inspection of the BVC image to automatically determine CT coordinates in the memory device substantially reduces inspection time. For example, one wafer includes 157 BVC images of the wafer. Each image includes tens of thousands of CTs. It takes about 960 seconds to inspect the entire wafer to determining the CT coordinates. The sixteen minutes inspection time is achieved by running a computer program implementing the disclosed method on a typically configured desktop computer. The computer configuration includes an Intel i7-8700 CPU @3.20 GHz, a GeForce GTX1060 (6 GB), 16 GB RAM, and 1 TB SSD.

In the embodiments of the present disclosure, the image processing method for determining the coordinates of each CT in the BVC image is adapted to each BVC image by taking account of overall brightness of the BVC image and brightness of individual CTs. Thus, the accuracy of determining the coordinates of each CT in the BVC image is improved.

Figure 6:
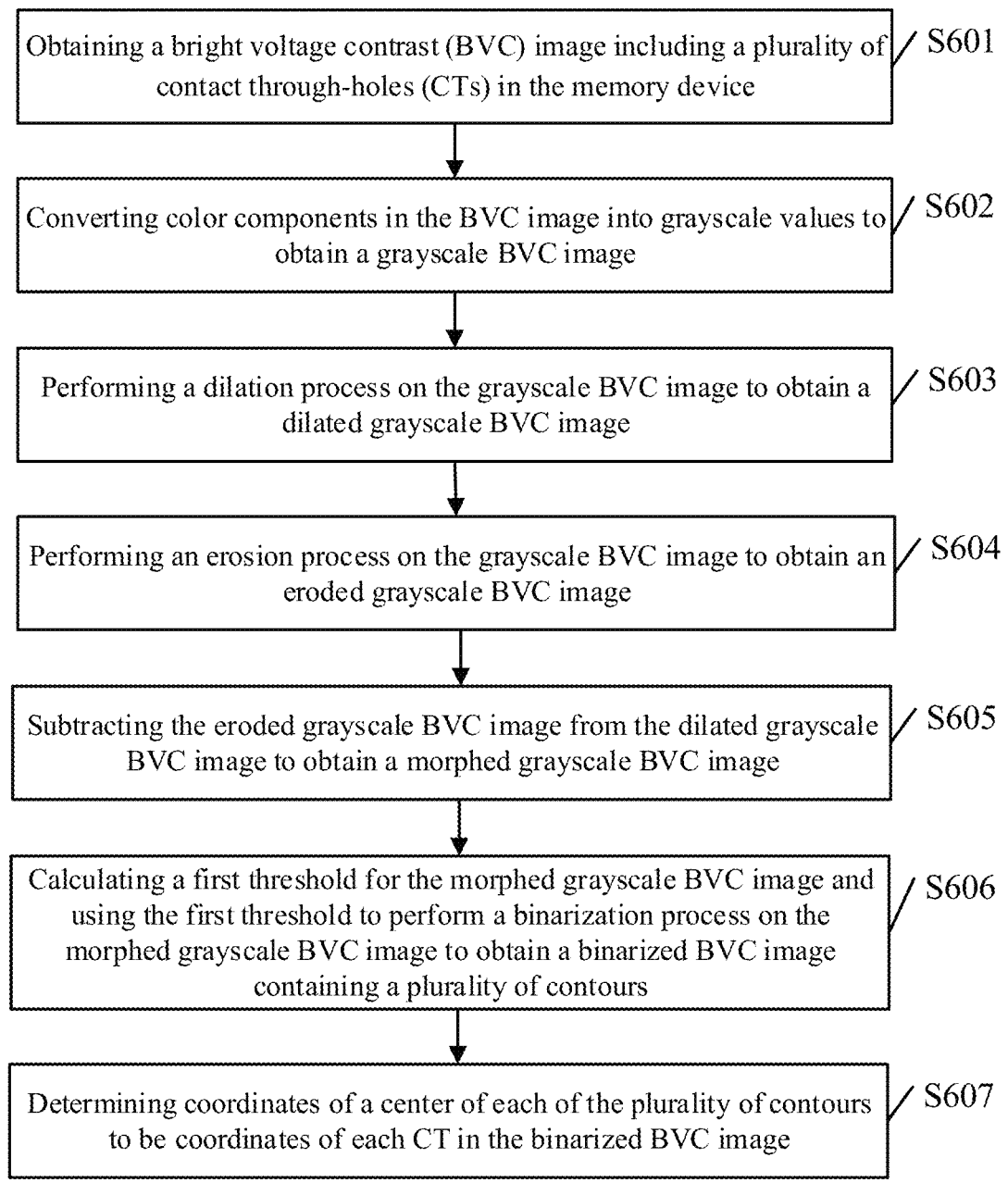
FIG. 6 is a schematic flowchart of another exemplary method for determining coordinates of CTs in the BVC image according to embodiments of the present disclosure.

The present disclosure also provides a method for determining coordinates of CTs in a memory device. As shown in FIG. 6, the method for determining the coordinates of each CT in the memory device includes the following processes.

At S601, a BVC image including a plurality of CTs in the memory device is obtained.

In some embodiments, the BVC image including the plurality of CTs in the memory device is obtained. The plurality of CTs may include the charged CTs and the uncharged CTs.

At S602, color components in the BVC image are converted into grayscale values to obtain a grayscale BVC image.

In some embodiments, the BVC image may be a color image. The color components in the BVC image may be converted into grayscale values. For example, a grayscale value is calculated by the following equation:

$$\text{Gray} = 0.299 \cdot \text{Red} + 0.587 \cdot \text{Green} + 0.114 \cdot \text{Blue},$$

where Gray, Red, Green, and Blue are an integer between 0 and 255 inclusively.

The grayscale value for black is 0 and the grayscale value for white is 255. A greater grayscale value indicates a brighter pixel and a smaller grayscale value indicates a darker pixel.

At S603, a dilation process is performed on the grayscale BVC image to obtain a dilated grayscale BVC image.

In some embodiments, after the grayscale BVC image is obtained, a Gaussian smooth (also known as Gaussian blur) process may be performed on the grayscale BVC image to reduce noises and details before performing the dilation process. Then, the dilation process is performed on the grayscale BVC image after the Gaussian smooth process is performed.

In some embodiments, as shown in FIG. 2, in the dilation process, an image A on the left is overlaid by an image B to obtain an image on the right according to $A \oplus B = \{x | (B)_x$ ∩A≠Φ}. In contrast to an erosion process, the dilation process makes bright pixels in the grayscale BVC image brighter.

In some embodiments, after the grayscale BVC image is obtained, a Gaussian smooth (also known as Gaussian blur) process may be performed on the grayscale BVC image to reduce noises and details before performing the dilation process. Then, the dilation process is performed on the grayscale BVC image after the Gaussian smooth process is performed.

At S604, an erosion process is performed on the grayscale BVC image to obtain an eroded grayscale BVC image.

Figure 7:
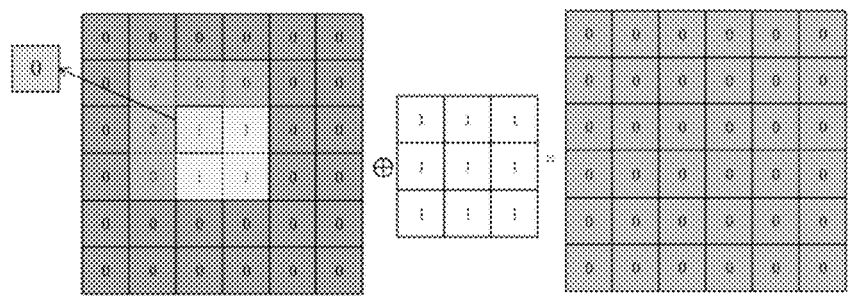
FIG. 7 is a schematic diagram showing an erosion process according to embodiments of the present disclosure.

In some embodiments, as shown in FIG. 7, in the erosion process, an image A on the left is overlaid by an image B to obtain an image on the right according to A⊖B= {x|(B)$_X$ ⊆A}. In contrast to the dilation process, the erosion process makes dark pixels in the grayscale BVC image darker.

At S605, the eroded grayscale BVC image is subtracted from the dilated grayscale BVC image to obtain a morphed grayscale BVC image.

Figure 8:
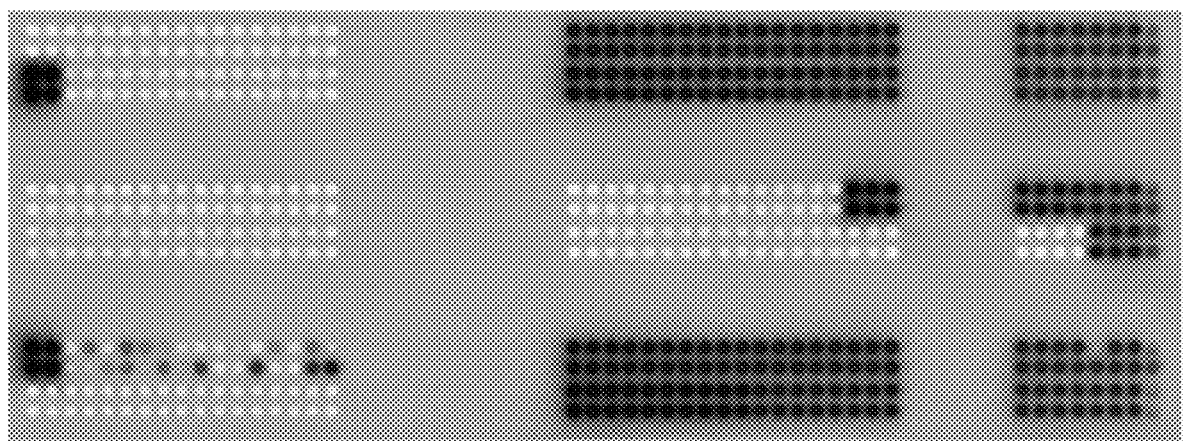
FIG. 8 is a schematic diagram of an exemplary grayscale BVC image before the subtraction process is performed according to embodiments of the present disclosure.
Figure 9:
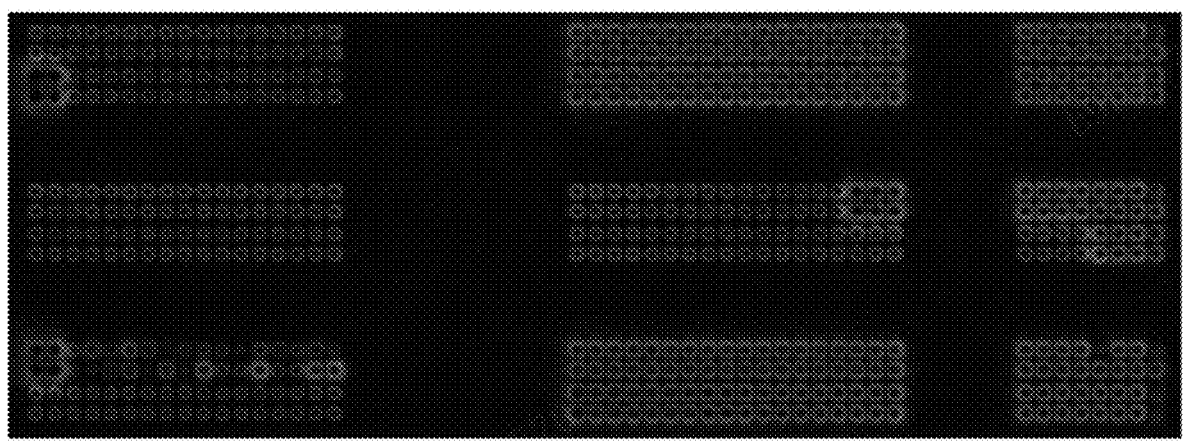
FIG. 9 is a schematic diagram of an exemplary grayscale BVC image after the subtraction process is performed according to embodiments of the present disclosure.

For example, FIG. 8 is a schematic diagram of an exemplary grayscale BVC image according to embodiments of the present disclosure. FIG. 9 is a schematic diagram of an exemplary grayscale BVC image after the subtraction process is performed on FIG. 8.

At S606, a first threshold for the morphed grayscale BVC image is calculated and the first threshold is used to perform a binarization process on the morphed grayscale BVC image to obtain a binarized BVC image containing a plurality of contours.

In some embodiments, Otsu's method is used to calculate the first threshold for the dilated BVC image. Otsu's method returns the first threshold to separate pixels in the dilated BVC image into a foreground and a background. The first threshold is determined by minimizing intra-class grayscale variance or maximizing inter-class grayscale variance. The first threshold T1 can be calculated by $$T1 = \mathrm{argmax}\{\delta_b(t)\} = \underset{1 \leq t \leq L}{\mathrm{argmax}}\{P_0(t)u_0^2(t) + P_1(t)u_1^2(t)\}.$$

In some embodiments, the binarization process converts the morphed grayscale BVC image into a black and white image, that is, the binarized BVC image, according to $$dst(x, y) = \begin{cases} 255, & src(x, y) > \text{first thresh} \\ 0, & src(x, y) \leq \text{first thresh} \end{cases}.$$

The binarized BVC image includes the plurality of contours, that is, circle-like shapes.

At S607, coordinates of a center of each of the plurality of contours are determined to be coordinates of each CT in the binarized BVC image.

After the plurality of contours are obtained, coordinates of a center of each of the plurality of contours can be determined to be coordinates of each CT in the binarized BVC image. The process of determining the coordinates of each CT based on the plurality of contours has been described in previous embodiments, and the description is omitted herein.

In some embodiments, after obtaining the coordinates of each CT, the method further includes: comparing a distribution pattern based on the coordinates of each CT in the dilated grayscale BVC image with a pre-determined CT distribution pattern; and adding coordinates of CTs absent in the distribution pattern based on the coordinates of each CT in the dilated grayscale BVC image and removing coordinates of each CT absent in the pre-determined CT distribution pattern.

In some embodiments, after obtaining the binarized BVC image containing the plurality of contours, the method further includes: calculating a width-over-height ratio and a perimeter of each of the plurality of contours in the binarized BVC image; determining whether the width-over-height ratio satisfies a width-over-height ratio condition and whether the perimeter satisfies a perimeter condition; and removing the corresponding contour from the plurality of contours in response to the width-over-height ratio unsatisfying the width-over-height ratio condition or the perimeter unsatisfying the perimeter condition.

In some embodiments, when determining coordinates of a center of each of the plurality of contours to be coordinates of each CT, the method further includes: obtaining coordinates of a center of gravity of each of the plurality of first contours based on a zero-order and a first-order moments of the corresponding first contour; and determining the coordinates of the center of gravity of the corresponding first contour to be the coordinates of each CT.

In the embodiments of the present disclosure, the image processing method for determining the coordinates of each CT in the BVC image is adapted to each BVC image by taking account of overall brightness of the BVC image and brightness of individual CTs. Thus, the accuracy of determining the coordinates of each CT in the BVC image is improved.

Figure 10:
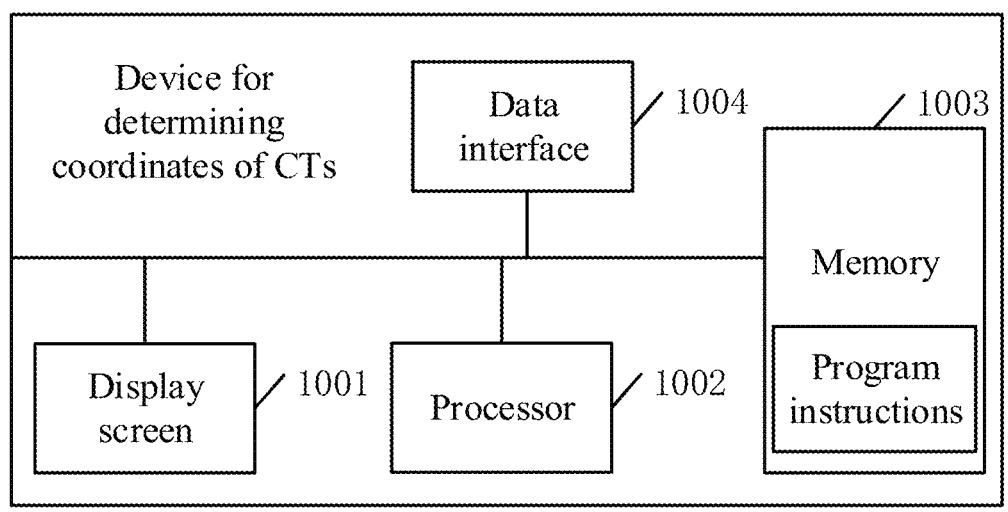
FIG. 10 is a schematic structural diagram of an exemplary device for determining coordinates of CTs in a BVC image according to embodiments of the present disclosure.

The present disclosure also provides a device of determining coordinates of CTs in a memory device. FIG. 10 is a schematic structural diagram of an exemplary device of determining the coordinates of each CT in the memory device according to embodiments of the present disclosure. As shown in FIG. 10, the device includes a display screen 1001, a processor 1002, a memory 1003, and a data interface 1004.

The display screen 1001 may be a liquid crystal display (LCD) or an organic light-emitting diode (OLED) display. The display screen may also be a touch screen. The processor 1002 may be a central processing unit (CPU). The processor 1002 may also include a hardware chip. The hardware chip may be an application-specific integrated circuit (ASIC), a programmable logic device (PLD), or a combination thereof. For example, the PLD may be a complex programmable logic device (CPLD), a field-programmable gate array (FPGA), or a combination thereof. The memory 1003 may include a volatile memory. The memory 1003 may also include a non-volatile memory. The memory 1003 may also include a combination of the foregoing types of memories. The data interface 1004 may include a keyboard, a mouse, a USB interface, and a communication interface. A user may use the keyboard, the mouse, and the USB interface to input the wafer image and the defect information. In some embodiments, the memory 1003 stores program instructions. When the program instructions are executed, the processor 1002 calls the program instructions stored in the memory 1003 to: obtain a bright voltage contrast (BVC) image including a plurality of CTs in the memory device; convert color components in the BVC image into grayscale values to obtain a grayscale BVC image; perform a dilation process on the grayscale BVC image to obtain a dilated grayscale BVC image; calculate a first threshold for the dilated grayscale BVC image and determine whether the first threshold is greater than or equal to a pre-determined value; in response to the first threshold being greater than or equal to the pre-determined value, perform a first image process on the dilated grayscale BVC image to obtain coordinates of each CT in the dilated grayscale BVC image; and in response to the first threshold being smaller than the pre-determined value, perform a second image process on the dilated grayscale BVC image to obtain the coordinates of each CT in the dilated grayscale BVC image.

In some embodiments, after the coordinates of each CT in the grayscale BVC image are determined, the processor 1002 is further configured to execute the program instructions stored in the memory 1003 to: compare a distribution pattern based on the coordinates of each CT in the grayscale BVC image with a pre-determined CT distribution pattern; and add coordinates of CTs absent in the distribution pattern based on the coordinates of each CT in the grayscale BVC image and remove coordinates of each CT absent in the pre-determined CT distribution pattern In some embodiments, the grayscale value is an integer between 0 for black and 255 for white inclusively; and the pre-determined value is 150.

In some embodiments, when performing the first image process, the processor 1002 is further configured to execute the program instructions stored in the memory 1003 to: use the first threshold to perform a binarization process on the dilated grayscale BVC image to obtain a first binarized BVC image; determine a plurality of first contours in the first binarized BVC image; and determine coordinates of a center of each of the plurality of first contours to be the coordinates of each CT In some embodiments, after determining the plurality of first contours in the first binarized BVC image, the processor 1002 is further configured to execute the program instructions stored in the memory 1003 to: calculate a width-over-height ratio and a perimeter of each of the plurality of first contours in the first binarized BVC image; determine whether the width-over-height ratio satisfies a width-over-height ratio condition and whether the perimeter satisfies a perimeter condition; and remove the corresponding contour from the plurality of first contours in response to the width-over-height ratio unsatisfying the width-over-height ratio condition or the perimeter unsatisfying the perimeter condition.

In some embodiments, when determining the coordinates of the center of each of the plurality of first contours to be the coordinates of each CT, the processor 1002 is further configured to execute the program instructions stored in the memory 1003 to: obtain coordinates of a center of gravity of each of the plurality of first contours based on a zero-order and a first-order moments of the corresponding first contour; and determine the coordinates of the center of gravity of the corresponding first contour to be the coordinates of each CT.

In some embodiments, when performing the second image process on the dilated grayscale BVC image to obtain the coordinates of each CT in the dilated grayscale BVC image, the processor 1002 is further configured to execute the program instructions stored in the memory 1003 to: use a second threshold to perform a binarization process on the dilated grayscale BVC image to obtain a second binarized BVC image; determine a plurality of second contours in the second binarized BVC image; perform an erosion process on the dilated grayscale BVC image to obtain an eroded grayscale BVC image; subtract the eroded grayscale BVC image from the dilated grayscale BVC image to obtain a morphed grayscale BVC image; use the first threshold to perform a binarization process on the morphed grayscale BVC image to obtain a third binarized BVC image; determine a plurality of third contours in the third binarized BVC image; combine the plurality of second contours and the plurality of third contours to obtain a plurality of fourth contours; and determine coordinates of a center of each of the plurality of fourth contours to be the coordinates of each CT.

In some embodiments, the second threshold is 200.

In some embodiments, after obtaining the plurality of fourth contours, the processor 1002 is further configured to execute the program instructions stored in the memory 1003 to: calculate a width-over-height ratio and a perimeter of each of the plurality of fourth contours; determine whether the width-over-height ratio satisfies a width-over-height ratio condition and whether the perimeter satisfies a perimeter condition; and remove the corresponding contour from the plurality of fourth contours in response to the width-over-height ratio unsatisfying the width-over-height ratio condition or the perimeter unsatisfying the perimeter condition.

In some embodiments, when determining the coordinates of the center of each of the plurality of fourth contours to be the coordinates of each CT, the processor 1002 is further configured to execute the program instructions stored in the memory 1003 to: obtain coordinates of a center of gravity of each of the plurality of fourth contours based on a zero-order and a first-order moments of the corresponding fourth contour; and determine the coordinates of the center of gravity of the corresponding fourth contour to be the coordinates of each CT.

In some embodiments, after obtaining the grayscale BVC image, the processor 1002 is further configured to execute the program instructions stored in the memory 1003 to perform a Gaussian smooth process on the grayscale BVC image before performing the dilation process.

In some embodiments, after determining the coordinates of each CT in the dilated grayscale BVC image, the processor 1002 is further configured to execute the program instructions stored in the memory 1003 to: review a grayscale value at a position of coordinates of each CT in the dilated grayscale BVC image to determine whether the corresponding CT is a defective CT; and display the defective CT in response to the corresponding CT being determined to be a defective CT.

In the embodiments of the present disclosure, the image processing method for determining the coordinates of each CT in the BVC image is adapted to each BVC image by taking account of overall brightness of the BVC image and brightness of individual CTs. Thus, the accuracy of determining the coordinates of each CT in the BVC image is improved.

The method provided by the embodiments of the present disclosure may also be used to detect other types of defects in the memory device as long as such defects can be captured in the BVC images and can be determined through evaluating grayscale values of the CTs.

The present disclosure also provides a non-transitory computer-readable storage medium. The non-transitory computer-readable storage medium stores a computer program. When being executed by a processor, the computer program implements the embodiments of the method of determining the coordinates of each CT in the BVC image shown in FIG. 1. The description thereof is omitted.

The non-transitory computer-readable storage medium may be an internal storage unit of the device described in any of the foregoing embodiments. For example, the non-transitory computer-readable storage medium may be a hard disk or an internal memory of the device. The non-transitory computer-readable storage medium may also be an external storage device of the device, such as a plug-in hard disk, a smart media card (SMC), a secure digital (SD) card, a flash card, etc. Further, the non-transitory computer-readable storage medium may also include an internal storage unit and the external storage device. The non-transitory computer-readable storage medium may also store the computer program, and other programs and data required by the device. The non-transitory computer-readable storage medium may also temporarily store already outputted data or to-be-outputted data.

Those skilled in the art should understand that all or part of the processes in the foregoing method embodiments can be implemented by instructing relevant hardware through a computer program. The computer program may be stored in the non-transitory computer-readable storage medium, and when being executed, the computer program implements the processes of the foregoing method embodiments. The storage medium may be a magnetic disk, an optical disk, a read-only memory (ROM), or a random-access memory (RAM).

The foregoing embodiments describe in detail the objective, the technical solution, and the beneficial effect of the present disclosure. The foregoing embodiments are only some of the embodiments of the present disclosure, which should not be used to limit the scope of present disclosure. Therefore, changes, equivalent replacements, and modifications made according to the claims of the present disclosure still fall within the scope of the present disclosure.

What is claimed is:

1. A method of determining coordinates of contact through-holes (CTs) in a memory device, comprising:
    obtaining a bright voltage contrast (BVC) image including a plurality of CTs in the memory device;
    converting color components in the BVC image into grayscale values to obtain a grayscale BVC image;
    performing a dilation process on the grayscale BVC image to obtain a dilated grayscale BVC image;
    calculating a first threshold for the dilated grayscale BVC image and determining whether the first threshold is greater than or equal to a pre-determined value, wherein the first threshold is an Otsu threshold;
    in response to the first threshold being greater than or equal to the pre-determined value, performing a first image process on the dilated grayscale BVC image to obtain coordinates of each CT in the dilated grayscale BVC image; and
    in response to the first threshold being smaller than the pre-determined value, performing a second image process on the dilated grayscale BVC image to obtain the coordinates of each CT in the dilated grayscale BVC image.

2. The method according to claim 1, further comprising, after obtaining the coordinates of each CT:
    comparing a distribution pattern based on the coordinates of each CT in the dilated grayscale BVC image with a pre-determined CT distribution pattern;
    identifying missing CT and incorrect CT in the distribution pattern, according to the comparing result between the distribution pattern and the pre-determined CT distribution pattern; and
    adding coordinates of the missing CT absent in the distribution pattern to the dilated grayscale BVC image and removing coordinates of the incorrect CT absent in the pre-determined CT distribution pattern from the dilated grayscale BVC image.

3. The method according to claim 1, wherein performing the first image process on the dilated grayscale BVC image to obtain coordinates of each CT in the dilated grayscale BVC image comprises:
    using the first threshold to perform a binarization process on the dilated grayscale BVC image to obtain a first binarized BVC image;
    determining a plurality of first contours in the first binarized BVC image; and
    determining coordinates of a center of each of the plurality of first contours to be the coordinates of each CT.

4. The method according to claim 3, further comprising, after determining the plurality of first contours in the first binarized BVC image:
    calculating a width-over-height ratio and a perimeter of each of the plurality of first contours in the first binarized BVC image;
    determining whether the width-over-height ratio satisfies a width-over-height ratio condition and whether the perimeter satisfies a perimeter condition; and
    removing the corresponding contour from the plurality of first contours in response to the width-over-height ratio unsatisfying the width-over-height ratio condition or the perimeter unsatisfying the perimeter condition.

5. The method according to claim 3, wherein determining the coordinates of the center of each of the plurality of first contours to be the coordinates of each CT comprises:
    obtaining coordinates of a center of gravity of each of the plurality of first contours based on a zero-order and a first-order moments of the corresponding first contour; and
    determining the coordinates of the center of gravity of the corresponding first contour to be the coordinates of each CT.

6. The method according to claim 1, wherein performing the second image process on the dilated grayscale BVC image to obtain the coordinates of each CT in the dilated grayscale BVC image comprises:
    using a second threshold to perform a binarization process on the dilated grayscale BVC image to obtain a second binarized BVC image;
    determining a plurality of second contours in the second binarized BVC image;
    performing an erosion process on the dilated grayscale BVC image to obtain an eroded grayscale BVC image;
    using the first threshold to perform a binarization process on the eroded grayscale BVC image to obtain a third binarized BVC image;
    determining a plurality of third contours in the third binarized BVC image;
    combining the second binarized BVC image containing the plurality of second contours and third binarized BVC image containing the plurality of third contours to obtain a fourth binarized BVC image containing a plurality of fourth contours; and
    determining coordinates of a center of each of the plurality of fourth contours to be the coordinates of each CT.

7. The method according to claim 6, further comprising, after obtaining the plurality of fourth contours:
    calculating a width-over-height ratio and a perimeter of each of the plurality of fourth contours;
    determining whether the width-over-height ratio satisfies a width-over-height ratio condition and whether the perimeter satisfies a perimeter condition; and
    removing the corresponding contour from the plurality of fourth contours in response to the width-over-height ratio unsatisfying the width-over-height ratio condition or the perimeter unsatisfying the perimeter condition.

8. The method according to claim 6, wherein determining the coordinates of the center of each of the plurality of fourth contours to be the coordinates of each CT comprises:
obtaining coordinates of a center of gravity of each of the plurality of fourth contours based on a zero-order and a first-order moments of the corresponding fourth contour; and
determining the coordinates of the center of gravity of the corresponding fourth contour to be the coordinates of each CT.

9. The method according to claim 1, further comprising, after obtaining the grayscale BVC image:
performing a Gaussian smooth process on the grayscale BVC image before performing the dilation process.

10. The method according to claim 1, further comprising, after determining the coordinates of each CT in the dilated grayscale BVC image:
reviewing a grayscale value at a position of coordinates of each CT in the dilated grayscale BVC image to determine whether the corresponding CT is a defective CT; and
displaying the defective CT in response to the corresponding CT being determined to be a defective CT.

11. A method of determining coordinates of contact through-holes (CTs) in a memory device, comprising:
obtaining a bright voltage contrast (BVC) image including a plurality of CTs in the memory device;
converting color components in the BVC image into grayscale values to obtain a grayscale BVC image;
performing a dilation process on the grayscale BVC image to obtain a dilated grayscale BVC image;
performing an erosion process on the grayscale BVC image to obtain an eroded grayscale BVC image;
subtracting the eroded grayscale BVC image from the dilated grayscale BVC image to obtain a morphed grayscale BVC image;
calculating a first threshold for the morphed grayscale BVC image and using the first threshold to perform a binarization process on the morphed grayscale BVC image to obtain a binarized BVC image containing a plurality of contours, wherein the first threshold is an Otsu threshold;
calculating a width-over-height ratio and a perimeter of each of the plurality of contours in the binarized BVC image;
determining whether the width-over-height ratio satisfies a width-over-height ratio condition and whether the perimeter satisfies a perimeter condition; and
removing the corresponding contour from the plurality of contours in response to the width-over-height ratio unsatisfying the width-over-height ratio condition or the perimeter unsatisfying the perimeter condition; and
determining coordinates of a center of each of the plurality of contours to be coordinates of each CT in the binarized BVC image.

12. The method according to claim 11, further comprising, after obtaining the coordinates of each CT:
comparing a distribution pattern based on the coordinates of each CT in the dilated grayscale BVC image with a pre-determined CT distribution pattern;
identifying missing CT and incorrect CT in the distribution pattern, according to the comparing result between the distribution pattern and the pre-determined CT distribution pattern; and
adding coordinates of the missing CT absent in the distribution pattern to the dilated grayscale BVC image and removing coordinates of the incorrect CT absent in the pre-determined CT distribution pattern from the dilated grayscale BVC image.

13. The method according to claim 11, wherein determining coordinates of a center of each of the plurality of contours to be coordinates of each CT comprises:
obtaining coordinates of a center of gravity of each of the plurality of first contours based on a zero-order and a first-order moments of the corresponding first contour; and
determining the coordinates of the center of gravity of the corresponding first contour to be the coordinates of each CT.

14. A device of determining coordinates of contact through-holes (CTs) in a memory device, comprising:
a display screen;
a memory storing program instructions; and
a processor configured to execute the program instructions stored in the memory to:
obtain a bright voltage contrast (BVC) image including a plurality of CTs in the memory device;
convert color components in the BVC image into grayscale values to obtain a grayscale BVC image;
perform a dilation process on the grayscale BVC image to obtain a dilated grayscale BVC image;
calculate a first threshold for the dilated grayscale BVC image and determine whether the first threshold is greater than or equal to a pre-determined value, wherein the first threshold is an Otsu threshold;
in response to the first threshold being greater than or equal to the pre-determined value, perform a first image process on the dilated grayscale BVC image to obtain coordinates of each CT in the dilated grayscale BVC image; and
in response to the first threshold being smaller than the pre-determined value, perform a second image process on the dilated grayscale BVC image to obtain the coordinates of each CT in the dilated grayscale BVC image.

15. The device according to claim 14, wherein after obtaining the coordinates of each CT, the processor is further configured to execute the program instructions stored in the memory to:
compare a distribution pattern based on the coordinates of each CT in the dilated grayscale BVC image with a pre-determined CT distribution pattern;
identify missing CT and incorrect CT in the distribution pattern, according to the comparing result between the distribution pattern and the pre-determined CT distribution pattern; and
add coordinates of the missing CT absent in the distribution pattern to the dilated grayscale BVC image and remove coordinates of the incorrect CT absent in the pre-determined CT distribution pattern from the dilated grayscale BVC image.

16. The device according to claim 14, wherein when performing the first image process on the dilated grayscale BVC image to obtain coordinates of each CT in the dilated grayscale BVC image, the processor is further configured to execute the program instructions stored in the memory to:
use the first threshold to perform a binarization process on the dilated grayscale BVC image to obtain a first binarized BVC image;
determine a plurality of first contours in the first binarized BVC image; and determine coordinates of a center of each of the plurality of first contours to be the coordinates of each CT.

17. The device according to claim 16, wherein after determining the plurality of first contours in the first binarized BVC image, the processor is further configured to execute the program instructions stored in the memory to:
- calculate a width-over-height ratio and a perimeter of each of the plurality of first contours in the first binarized BVC image;
- determine whether the width-over-height ratio satisfies a width-over-height ratio condition and whether the perimeter satisfies a perimeter condition; and
- remove the corresponding contour from the plurality of first contours in response to the width-over-height ratio unsatisfying the width-over-height ratio condition or the perimeter unsatisfying the perimeter condition.

18. The device according to claim 16, wherein when determining the coordinates of the center of each of the plurality of first contours to be the coordinates of each CT, the processor is further configured to execute the program instructions stored in the memory to:
- obtain coordinates of a center of gravity of each of the plurality of first contours based on a zero-order and a first-order moments of the corresponding first contour; and
- determine the coordinates of the center of gravity of the corresponding first contour to be the coordinates of each CT.

19. The device according to claim 14, wherein when performing the second image process on the dilated grayscale BVC image to obtain the coordinates of each CT in the dilated grayscale BVC image, the processor is further configured to execute the program instructions stored in the memory to:
- use a second threshold to perform a binarization process on the dilated grayscale BVC image to obtain a second binarized BVC image;
- determine a plurality of second contours in the second binarized BVC image;
- perform an erosion process on the dilated grayscale BVC image to obtain an eroded grayscale BVC image;
- use the first threshold to perform a binarization process on the eroded grayscale BVC image to obtain a third binarized BVC image;
- determine a plurality of third contours in the third binarized BVC image;
- combine the second binarized BVC image containing the plurality of second contours and third binarized BVC image containing the plurality of third contours to obtain a fourth binarized BVC image containing a plurality of fourth contours; and
- determine coordinates of a center of each of the plurality of fourth contours to be the coordinates of each CT.

\* \* \* \* \*